Jan. 25, 1966 D. R. GRAHL ETAL 3,231,703

ROOM THERMOSTAT COMPRISING A PAIR OF BIMETAL ACTUATORS

Filed Nov. 5, 1962

INVENTORS
DARWIN R. GRAHL
WALTER F. RUFFER
BY
Andrew K. Foulds
their Attorney

_United States Patent Office_ 3,231,703
Patented Jan. 25, 1966

3,231,703
ROOM THERMOSTAT COMPRISING A PAIR OF BIMETAL ACTUATORS
Darwin R. Grahl, Lincoln Park, and Walter F. Ruffer, Birmingham, Mich., assignors to American Radiator & Standard Sanitary Corporation, New York, N.Y., a corporation of Delaware
Filed Nov. 5, 1962, Ser. No. 235,382
6 Claims. (Cl. 200—138)

This invention relates to air conditioning systems and wall thermostats employed therein.

One object of the invention is to provide a relatively low cost wall thermostat which is able to control two-stage cooling and one-stage heating.

A further object is to provide a wall thermostat and air conditioning control system wherein a single anticipating heater in the thermostat is operative to provide conditioning anticipation during both the heating and cooling cycles.

An additional object of the invention is to provide a heating-cooling thermostat having two switch-actuating bimetals, both carried by a single low cost mounting post construction but at the same time being capable of independent calibration.

A further object is to provide a heating-cooling thermostat having a single temperature adjustment operator arm for controlling the thermostat during both heating and cooling periods.

A further object is to provide an air conditioning control circuit in which relatively low cost switches are employed in the wall thermostat part of the control circuit.

A general object of the invention is to provide a heating-cooling system and wall thermostat arrangement having a lower manufacturing cost than corresponding previously known systems and arrangements.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
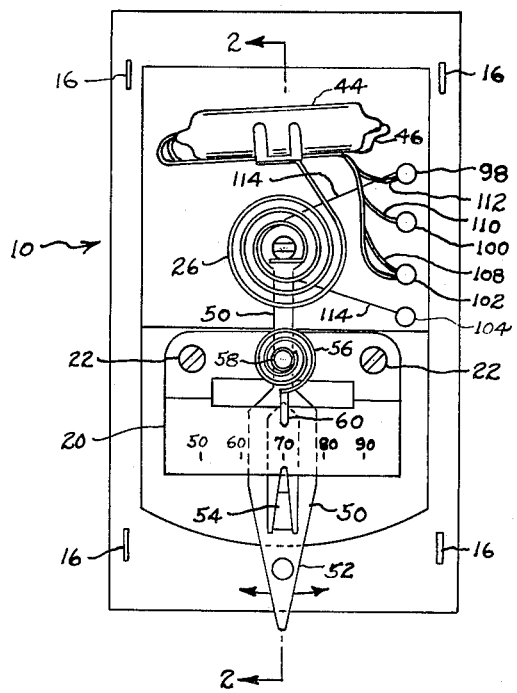
FIGURE 1 is a front elevational view of a wall thermostat employed in the practice of this invention, with the cover thereof removed to illustrate internal details of construction.
Figure 2:
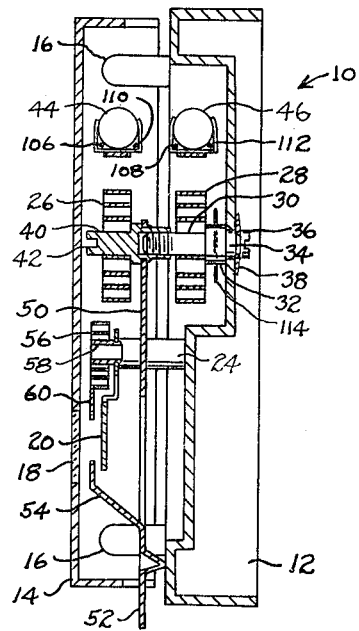
FIG. 2 is a sectional view taken on line 2—2 in FIG. 1.

Referring to FIGS. 1 and 2 of the drawing, there is shown a wall thermostat 10 comprising a fixed base 12, preferably of plastic material, and a removable cover 14, also preferably of plastic material. The base may be provided with four conventional spring arms 16 for gripping internal surfaces of the cover to frictionally retain it in place on the base. Preferably the cover is provided with a transparent viewing window 18 for enabling the room occupant to view temperature indicia provided on indicia plate 20, said plate being mounted on the base 12 by means of screws 22 which extend into posts 24 formed integrally with the base. This mechanism for mounting the indicia plate is old in the art and is not part of the present invention.

One feature of the invention resides in the construction for mounting two switch-actuating bimetals 26 and 28. This mounting construction preferably comprises a rotary post structure having two relatively adjustable post portions 30 and 40. As best shown in FIG. 2, post portion 30 has an intermediate area which carries bimetal 28, an enlarged section 32 which rests on the front surface of base 12, and a spindle portion 34 which extends through a circular opening in base 12 to permit the post portion to have rotary adjusting movement relative to the base. A head portion 36 is formed on post portion 30 and is provided with a screw driver slot for adjusting or calibrating operations to be later described.

In order that the post structure may be mounted to turn semi-freely on the base without wobbling or disengagement, there is provided a spring washer 38 preferably formed as a strip of spring metal having a U-shaped configuration fitting a groove in spindle portion 34. As shown in FIG. 2, the left or front end of post portion 30 is threaded and is disposed within an internally threaded portion of the second post portion 40. The intermediate area of this second post portion serves as an anchorage for the inner most convolution of switch-actuating bimetal 26, and the left end of post portion 40 is provided with a screw driver slot 42 for a calibrating adjustment to be described hereinafter.

As shown in FIG. 1, bimetal 26 is of spiral configuration and is arranged on post portion 40 so that its inner convolution is secured to the post portion and its outer convolution supports a conventional mercury switch 44. Although not shown in FIG. 1, bimetal 28 is configured similarly to bimetal 26, and its outer free end carries a second mercury switch 46.

Bimetals 26 and 28 are both exposed to room temperature so that each bimetal expands and contracts with room temperature change. However, post portions 30 and 40 are preferably adjusted on one another so that switch 46 is tilted slightly clockwise of switch 44. By this arrangement the mercury switches are actuated at different temperatures; preferably the difference is about three thermal degrees. Each of the switches is of conventional construction such that a slight counterclockwise tilting action closes its two contacts and a slight clockwise tilting action opens its contacts. The differential between closing and opening is preferably about two thermal degrees.

In order to vary the switch-actuation temperatures of the two switches there is provided a manually movable operator arm 50 which is suitably affixed to post portion 40 and which extends downwardly to provide a manually accessible lower end portion 52. A temperature-correlating pointer 54 is carried on arm 50 so as to traverse the temperature indicia on plate 20, all as generally conventional in the wall thermostat art. Arm 50 may if desired be secured to post portion 30 rather than post portion 40 since the two post portions move together during normal operation of the arm, i.e., the entire post structure defined by post portions 30 and 40 has a rotary mounting at 34 in base 12 so that manual force applied to arm portion 52 is effective to rotate the entire post structure. The threaded interengagement of the two post portions 30 and 40 is only uilized for adjustment operations at the factory or by the serviceman. During normal operation the two post portions act as a single unitarily movable structure.

Conventionally wall thermostats are provided with thermometers, and in the illustrated construction the thermometer takes the form of a small spiral bimetal 56 having its innermost convolution secured to a tube 58 carried on plate 20 and having its outermost convolution secured to a pointer 60 which registers with the indicia on plate 20 and which is visible through the viewing window 18. With respect to the thermostat construction per se, the invention is not concerned with thermometer 56 but is rather concerned with bimetals 26 and 28, and the mechanism for mounting them on base 12.

Figure 3:
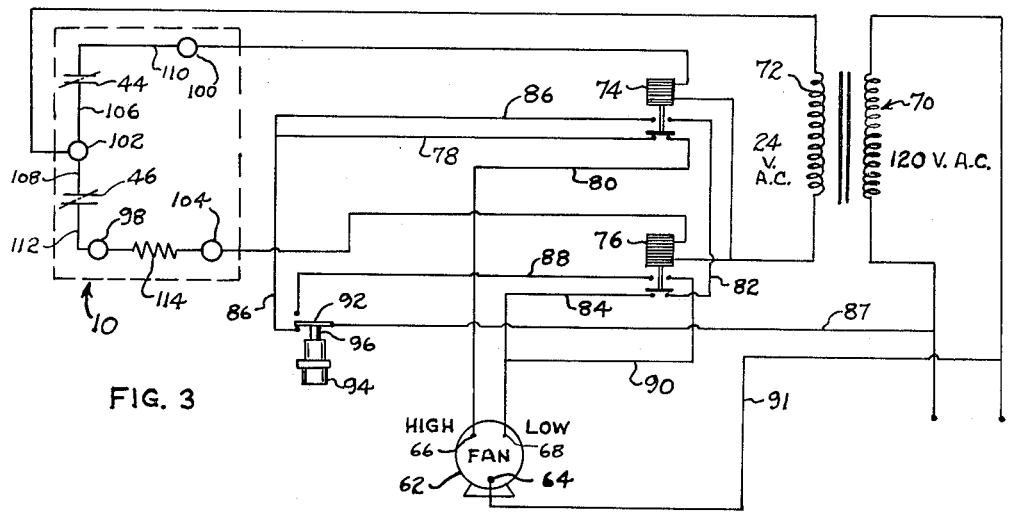
FIG. 3 is a wiring diagram of an air conditioning control circuit in which the FIG. 1 thermostat is utilized.

Referring now to FIG. 3, there is shown a wiring diagram for a heating-cooling system of the type which includes a finned heat exchange coil and cooperating fan. The heat exchange coil (not shown) is arranged in the path of air being circulated by the fan so that the circulated air temperature is raised or lowered in accordance with the temperatuure of the heat exchange fluid flowing through the coil. During winter operation hot fluid is pumped through the coil, and during summer operation cold fluid is pumped through the coil. In the illustrated arrangement the fan motor is wired to provide two motor speeds for achieving low stage cool, high stage cooling, and low stage heating.

As shown in FIG. 3, fan motor 62 has three terminals numbered 64, 66 and 68. When current is fed through terminals 64 and 68 the fan operates at low speed, and when current is fed through terminals 64 and 66 the fan operates at high speed. Fan motor 62 is connected across the high voltage primary of a transformer 70. The low voltage secondary 72 feeds current to the coils 74 and 76 of two low voltage relays, which are electrically connected with wall thermostat 10 so that when mercury switch 44 is in a closed position relay coil 74 is energized and when mercury switch 46 is closed relay coil 76 is energized. Coils 74 and 76 are both shown in the de-energized positions in which coil 74 closes the circuit between lines 78 and 80, and in which coil 76 closes the circuit between lines 82 and 84. When relay coil 74 is energized it opens the circuit across lines 78 and 80 and closes the circuit across lines 86 and 82. When relay coil 76 is energized it opens the circuit across lines 82 and 84, and closes the circuit across lines 88 and 90.

As will be seen from the wiring diagram, current flow through lines 78, 86, 84 and 88 is controlled not only by the relay coils but also by a switch 92. Switch 92 is preferably actuated by a thermostatic power means, shown in the drawing as a conventional wax-filled thermostatic power element 94 having a piston 96 movable to operate the switch in accordance with expansion and contraction of the wax charge within the power element casing. Such power elements are old in the art and are not part of the present invention except as they cooperate in the described control.

Preferably power element 94 is mounted on the aforementioned heat exchange coil which is arranged in the path of the air being circulated by the fan of motor 62. The heat exchange coil is during the summer months supplied with cold water or other heat exchange fluid, and is during the winter months supplied with hot water or other heating fluid. Power element 94 is arranged so that it responds to the temperature of water flowing through the coil to thus cause switch 92 to feed current to line 86 or line 88, depending on whether the coil is handling cold water or hot water. The switch in its illustrated position is set for summer operation in which it feeds current to line 86. In the winter position the switch feeds current to line 88.

It will be noted from FIGS. 1 and 2 that wall thermostat 10 is provided with four terminals numbered 98, 100, 102 and 104. Terminal 102 is provided with two insulated lead wires 106 and 108, one of which serves as a lead for switch 44, and the other of which serves as a lead for switch 46. The remaining lead for switch 44 is provided by an insulated wire 110 which connects with terminal 100, and the remaining lead for switch 46 is provided by an insulated wire 112 which connects with a terminal 98. Each of the four insulated lead wires is of sufficient length to provide slack when the respective mercury switches are being moved by their operating bimetals or by adjustment of arm 50.

The wall thermostat is preferably provided with an anticipating heater which in the illustrated form consists of a length of resistance wire 114. As shown best in FIG. 1, resistance wire 114 extends from terminal 98 around the post portion 32 and then over to the terminal 104. The heater is positioned closely adjacent bimetal 28 so as to direct heat to the bimetal by convection when switch 46 is in a closed condition.

In considering the operation of the FIG. 3 control circuit we can consider first the operation which occurs during low stage cooling, second the operation which occurs during high stage cooling, and third the operation which occurs during low stage heating.

LOW STAGE COOLING

In the FIG. 1 position operator arm 50 is located with its pointer 54 at the 70 degree mark on scale 20. Also, the room temperature is 70 degrees as indicated by pointer 60. Bimetal switch 44 is tilted in a counterclockwise direction to the closed position, and switch 46 is just closed. Under these circumstances, each of the three lines 80, 84 and 90 is dead so that fan motor 62 is in a de-energized condition.

Switches 44 and 46 are constructed and arranged so that when pointer 54 registers with the seventy degree mark switch 44 opens at seventy-five degrees on rising temperature and closes at seventy-three degrees on falling temperature; switch 46 opens at seventy-two degrees on rising temperature and closes at seventy degrees on falling temperature. Thus, each switch has a two degree differential, and the actuation temperatures of the two switches are three degrees apart.

If we now assume that the room temperature has just been lowered to seventy degrees bimetals 26 and 28 will each be in their switch-closed positions so that bimetal 28 is being heated by heater 114 sufficiently to open switch 46. This action de-energizes relay coil 76 so that fan motor 62 is energized by a circuit which includes line 87, switch 92, and lines 86, 82, 84 and 91. Heater 114 can therefore anticipate cooling needs and call for low stage cooling even while the room temperature is still quite near seventy degrees, i.e., at the setting of operator 50.

The low stage cooling operation is initiated by heater 114 and is continued while there is a room cooling need. However as soon as heater 114 causes switch 46 to open its contacts the heater is de-energized. Bimetal 28 thus begins to cool from the seventy-two degree switch-open condition toward the seventy degree switch-closed condition. This cooling action on the bimetal is fairly rapid so that in the absence of significant room cooling load the heater 114 cannot maintain fan motor 62 in the low stage cooling condition. If the room requires significant cooling action, as indicated by a room temperature rise to seventy-two degrees, bimetal 28 is maintained in the switch-open condition in which motor 62 is energized by the circuitry through line 84.

HIGH STAGE COOLING

If we assume the room temperature rises to seventy-five degrees, switch 44 then opens to de-energize relay 74. Relay 76 has already been opened so the circuit is then as shown in FIG. 3. Fan motor 62 is thus energized by a circuit which includes 87, switch 92, and lines 86, 78, 80 and 91. This produces high stage cooling.

When the high stage cooling drops the room temperature to seventy-three degrees switch 44 closes, whereupon relay 74 is energized to disconnect lines 78 and 80 and connect lines 86 and 82. At this point then we drop down to low stage cooling which is under the control of anticipating heater 114.

LOW STAGE HEATING

Assume the illustrative position of arm 50, a room temperature of sixty-nine degrees, and the winter position of switch 92. Both switches 44 and 46 are then closed for energizing relay coils 74 and 76. Line 86 is dead, but a fan motor-energizing circuit is provided through line 87, switch 92, and lines 88, 90 and 91. This provides low stage heating.

As the room temperature rises the anticipating heater 114 provides a locally elevated temperature in bimetal 28 so that by the time the general room temperature is raised to seventy degrees bimetal 28 may be nearing its seventy-two degree opening temperature for thus de-energizing relay 76 to discontinue the room heating operation.

The differential between room temperature and bimetal 28 temperature then allows the bimetal to cool so that it subsequently reaches its switch-closed temperature of seventy degrees sooner than otherwise. Thus relay 76 is energized to again bring in the low stage heating action.

The operation of the circuit has been described with arm 50 set at the seventy degree mark on dial 20. However it will be appreciated that the operation is the same with any desired temperature setting of arm 50. Thus, counterclockwise adjustment of arm 50 raises the actuating temperature for each switch, and clockwise adjustment lowers it, for thereby allowing the mechanism to achieve the same mode of operation in any position of arm 50.

The switch actuation temperatures for bimetals 26 and 28 are correlated with the arm 50 position by screw driver factory adjustments at points 36 and 42. By holding portion 36 fixed and adjusting portion 42 with a screw driver or other similar tool we can set the actuation temperature for switch 44. Then by holding portion 42 fixed and adjusting portion 36 with a screw driver or other similar tool we can set the actuation temperature for switch 44.

In the field the wiring arrangement and parts relationship permit heater 114 to act as an anticipator for both cooling and heating. Electrical heating for conditioning anticipation purposes is of course old in the art. However it is believed novel to provide an arrangement wherein a single anticipating heater is operative during both the winter and summer control periods. The arrangement makes for wiring simplicity and simplified control arrangements, both in the wall thermostat and in the other cooperating mechanisms.

It will be understood that some features of the illustrated arrangement may be employed without others. For example, the invention could be practiced in single stage cooling and single stage heating, or in multi-stage cooling without the heating.

What we claim as our invention is as follows:

1. A wall thermostat comprising a base; a manually adjustable rotatable post carried on said base; a first switch-actuating bimetal carried on and completely supported by said post; and a second switch-actuating bimetal carried on and completely supported by said post; said bimetals being unconnected except through the post so that their respective switches are actuated at different temperatures.

2. A wall thermostat comprising a base; a manually adjustable rotatable post projecting right angularly from said base and comprising two post portions adjustable rotationally relative to one another; a first switch-actuating bimetal carried on and completely supported by one post portion; and a second switch-actuating bimetal carried on and completely supported by the other post portion; said post portions being adjustable relative to one another so that the switches are actuated at different temperatures; and a lever arm affixed to the post and lying generally parallel to the base for manual adjustment of said post.

3. A wall thermostat comprising a base; a manually adjustable rotatable post carried on said base and comprising two axially aligned post portions threaded on one another so that the post portions are adjustable rotationally relative to one another; a first switch-actuating bimetal carried on and completely supported by one post portion; and a second switch-actuating bimetal carried on and completely supported by the other post portion; said post portions being relatively adjustable, and the bimetals being unconnected so that the switches are actuable at different temperatures.

4. A wall thermostat comprising a base; a manually adjustable rotatable post carried on said base; a first switch-actuating bimetal of spiral configuration arranged with an inner convolution thereof anchored to and completely supported by the post, and an outer unsupported convolution thereof free for switch-actuating purposes; a second switch-actuating bimetal of spiral configuration arranged with its inner convolution anchored on and completely supported by a second portion of the post, and with its outer unsupported convolution free for switch-actuating purposes; said bimetals being located in unconnected positions on the post so that their respective switches are actuated at different temperatures.

5. A wall thermostat comprising a base; a manually adjustable rotatable post carried on said base and comprising two axially aligned post portions having meshed threaded areas for permitting relative rotary adjustment of one portion on another; a first switch-actuating bimetal of spiral configuration arranged with an inner convolution thereof anchored on and completely supported by one of the post portions and with an outer unsupported convolution thereof free for switch-actuating purposes; a second switch-actuating bimetal of spiral configuration arranged with an inner convolution thereof anchored on and completely supported by the other post portion, and with an outer unsupported convolution thereof free for switch-actuating purposes; said post portions being adjustable relative to one another so that the switches are actuable at different temperatures.

6. A wall thermostat comprising a base having front and rear faces; a manually adjustable rotatable post carried on said base and comprising two post portions; one of said post portions extending through the base and having a tool-engageable section disposed adjacent the rear face of said base and having a threaded portion on its other end; the other post portion having a rear threaded end portion meshed with the first threaded portion and having its front end constituting a tool-engageable portion; a first bimetal carried on and completely supported by an intermediate area of the first post portion; and a second bimetal carried on and completely supported by an intermediate area of the second post portion.

References Cited by the Examiner
UNITED STATES PATENTS

| | | | |
|---|---|---|---|
| 2,043,834 | 6/1936 | Marbury | 200—138 |
| 2,180,802 | 11/1939 | Dillman | 200—122 |
| 2,245,439 | 6/1941 | Hull | 200—138 |
| 2,281,399 | 4/1942 | Wattles | 236—68 |
| 2,287,248 | 6/1942 | Holmes | 236—68 |
| 2,834,625 | 5/1958 | Stanley et al. | 287—125 |
| 2,859,992 | 11/1958 | Levy | 287—125 |
| 2,969,916 | 1/1961 | Shequen | 236—68 |
| 2,987,595 | 6/1961 | Nelson | 200—122 |
| 3,014,704 | 12/1961 | Bierwirth et al. | 165—26 |
| 3,047,273 | 7/1962 | Scarr | 165—26 |
| 3,080,465 | 3/1963 | Pelishek | 200—138 |

FOREIGN PATENTS

| | | |
|---|---|---|
| 367,561 | 2/1932 | Great Britain. |

BERNARD A. GILHEANY, *Primary Examiner.*

J. W. WESTHAVER, ROBERT K. SCHAEFER,
*Examiners.*